US008082691B2

(12) United States Patent
Walther et al.

(10) Patent No.: US 8,082,691 B2
(45) Date of Patent: Dec. 27, 2011

(54) SYSTEM FOR REPELLING SMALL MAMMALS

(76) Inventors: Bernd Walther, Havixbeck (DE); Olaf Fuelling, Duisburg (DE)

(*) Notice: Subject to any disclaimer, the term of this patent is extended or adjusted under 35 U.S.C. 154(b) by 208 days.

(21) Appl. No.: 12/313,930

(22) Filed: Nov. 26, 2008

(65) Prior Publication Data
US 2009/0133317 A1 May 28, 2009

(30) Foreign Application Priority Data
Nov. 28, 2007 (DE) .................. 10 2007 057 244

(51) Int. Cl.
*A01M 23/08* (2006.01)
*A01M 23/02* (2006.01)
*A01M 23/00* (2006.01)

(52) U.S. Cl. ................ 43/66; 43/58; 43/64; 43/65

(58) Field of Classification Search .......... 43/58, 60, 43/61, 64–67, 121, 107, 132.1, 124; 47/33; 52/102; 256/24, 25, 32
See application file for complete search history.

(56) References Cited

U.S. PATENT DOCUMENTS

| | | | | |
|---|---|---|---|---|
| 113,145 A * | 3/1871 | Dickson et al. ............. 47/33 |
| 155,644 A * | 10/1874 | Faunce .................... 43/107 |
| 355,366 A * | 1/1887 | Wise et al. ................ 43/121 |
| 360,293 A * | 3/1887 | Haines .................... 43/121 |
| 383,700 A * | 5/1888 | Brusie ..................... 43/66 |
| 392,347 A * | 11/1888 | Krause .................... 43/107 |
| 395,678 A * | 1/1889 | Wiebrock ................. 43/107 |
| 413,507 A * | 10/1889 | Halstead .................. 43/107 |
| 464,535 A * | 12/1891 | Walker .................... 43/121 |
| 473,965 A * | 5/1892 | Royse ..................... 43/121 |
| 530,723 A * | 12/1894 | Scheibel .................. 43/67 |
| 643,677 A * | 2/1900 | Payne ..................... 47/33 |
| 664,926 A * | 1/1901 | Briggs ..................... 43/65 |
| 760,738 A * | 5/1904 | Huguley .................. 43/67 |
| 812,761 A * | 2/1906 | Meier ..................... 43/65 |
| 934,469 A * | 9/1909 | Shoup ..................... 43/66 |
| 1,011,304 A * | 12/1911 | Andrews .................. 43/65 |
| 1,044,202 A * | 11/1912 | Lindberg .................. 43/66 |
| 1,135,159 A * | 4/1915 | Cox ....................... 43/121 |
| 1,139,501 A * | 5/1915 | Dennis .................... 43/65 |
| 1,373,827 A * | 4/1921 | Nelson et al. ............. 43/107 |
| 1,471,986 A * | 10/1923 | Voges ..................... 43/121 |
| 1,497,883 A * | 6/1924 | Sosbee .................... 43/66 |
| 1,584,079 A * | 5/1926 | Cook ...................... 43/121 |
| 1,788,047 A * | 1/1931 | Brunner ................... 43/66 |
| 1,820,186 A * | 8/1931 | Gaskins ................... 43/131 |
| 1,955,496 A * | 4/1934 | Harris ..................... 43/66 |
| 2,004,841 A * | 6/1935 | Vinson .................... 43/131 |
| 2,122,147 A * | 6/1938 | Lamp ...................... 43/67 |
| 2,149,495 A * | 3/1939 | Barnard et al. ............ 43/107 |

(Continued)

FOREIGN PATENT DOCUMENTS

CH     632898 A5 * 11/1982

(Continued)

*Primary Examiner* — Darren W Ark
(74) *Attorney, Agent, or Firm* — Collard & Roe, P.C.

(57) ABSTRACT

A system for defense against small mammals, for example voles, for areas used for agricultural or horticultural purposes, consists of segments to be put together to form a gutter that is open towards the top, forming a type of fence. Each segment has a base plate and walls that rise laterally from this base plate. An inlet opening is provided, at least in the side wall that faces away from the area to be protected.

5 Claims, 3 Drawing Sheets

U.S. PATENT DOCUMENTS

| | | | | |
|---|---|---|---|---|
| 2,184,904 A * | 12/1939 | Boehme | | 47/33 |
| 2,197,885 A * | 4/1940 | Brodie | | 43/107 |
| 2,328,590 A * | 9/1943 | Weil | | 43/131 |
| 2,562,663 A * | 7/1951 | Golaszewski | | 43/66 |
| 2,722,081 A * | 11/1955 | Heffner | | 43/121 |
| 2,782,561 A * | 2/1957 | Smith | | 47/33 |
| 2,909,328 A * | 10/1959 | Babyak | | 47/48.5 |
| 3,089,282 A * | 5/1963 | Tennison | | 52/101 |
| 3,415,013 A * | 12/1968 | Galbraith | | 47/33 |
| 3,484,989 A * | 12/1969 | Lazinsky | | 47/33 |
| 3,495,352 A * | 2/1970 | Sbare | | 47/33 |
| 3,591,972 A * | 7/1971 | Hess | | 43/58 |
| 3,713,624 A * | 1/1973 | Niemann | | 47/33 |
| 3,768,569 A * | 10/1973 | Nunnery | | 47/33 |
| 3,786,591 A * | 1/1974 | Morford | | 43/66 |
| 3,951,294 A * | 4/1976 | Wilson | | 47/33 |
| 3,991,508 A * | 11/1976 | Petrosky | | 43/66 |
| 4,048,747 A * | 9/1977 | Shanahan et al. | | 43/114 |
| 4,103,448 A * | 8/1978 | Souza | | 43/67 |
| 4,165,577 A * | 8/1979 | Shanahan et al. | | 43/112 |
| 4,186,512 A * | 2/1980 | Berg | | 43/98 |
| 4,241,532 A * | 12/1980 | Fancy | | 43/112 |
| 4,244,134 A * | 1/1981 | Otterson | | 43/58 |
| 4,281,471 A * | 8/1981 | Jenkins et al. | | 43/131 |
| 4,319,423 A * | 3/1982 | Judd | | 43/121 |
| 4,372,079 A * | 2/1983 | Trageser | | 47/33 |
| 4,478,391 A * | 10/1984 | Kovach | | 256/32 |
| 4,566,218 A * | 1/1986 | Kurosawa et al. | | 43/61 |
| 4,566,219 A * | 1/1986 | Firth | | 43/107 |
| 4,644,685 A * | 2/1987 | Tisbo et al. | | 47/33 |
| 4,663,883 A * | 5/1987 | Hilliard et al. | | 47/33 |
| 4,698,934 A * | 10/1987 | Gonzalez et al. | | 43/121 |
| 4,709,504 A * | 12/1987 | Andric | | 43/121 |
| 4,807,391 A * | 2/1989 | Bokiau | | 43/131 |
| 4,809,459 A * | 3/1989 | Brylla et al. | | 47/33 |
| 4,858,379 A * | 8/1989 | West | | 47/33 |
| 4,876,823 A * | 10/1989 | Brunetti | | 43/124 |
| 4,907,783 A * | 3/1990 | Fisk et al. | | 47/33 |
| 4,964,619 A * | 10/1990 | Glidden, Jr. | | 47/33 |
| 4,965,959 A * | 10/1990 | Gagne | | 43/66 |
| 4,998,376 A * | 3/1991 | Scherjbak | | 43/61 |
| 5,048,241 A * | 9/1991 | Gavin, Jr. | | 47/33 |
| 5,170,584 A * | 12/1992 | Perry | | 43/121 |
| 5,210,974 A * | 5/1993 | Pence | | 43/131 |
| 5,212,917 A * | 5/1993 | Kurtz et al. | | 47/33 |
| 5,274,950 A * | 1/1994 | Roberts | | 43/121 |
| 5,279,083 A * | 1/1994 | Savorani | | 52/102 |
| 5,303,523 A * | 4/1994 | Hand et al. | | 43/121 |
| 5,377,447 A * | 1/1995 | Fritch | | 47/33 |
| 5,390,441 A * | 2/1995 | Pence | | 43/131 |
| 5,452,539 A * | 9/1995 | Kurosawa et al. | | 43/61 |
| 5,497,576 A * | 3/1996 | Nowak | | 43/58 |
| 5,535,545 A * | 7/1996 | Matz | | 47/33 |
| 5,584,602 A * | 12/1996 | Bevil | | 47/33 |
| 5,615,866 A * | 4/1997 | Kinnison | | 256/32 |
| 5,720,128 A * | 2/1998 | Smith et al. | | 47/33 |
| 5,852,895 A * | 12/1998 | Sinanan | | 47/33 |
| 5,857,288 A * | 1/1999 | Wiste | | 47/33 |
| 5,926,999 A * | 7/1999 | Vernon et al. | | 43/121 |
| 6,009,661 A * | 1/2000 | Lloyd | | 43/61 |
| 6,164,010 A * | 12/2000 | Snell et al. | | 43/132.1 |
| 6,336,290 B1 * | 1/2002 | Callan | | 47/33 |
| 6,354,038 B1 * | 3/2002 | Morris | | 47/33 |
| 6,418,663 B1 * | 7/2002 | Smith | | 47/48.5 |
| 6,561,491 B2 * | 5/2003 | Thompson et al. | | 47/33 |
| 6,606,818 B1 * | 8/2003 | Christmas | | 43/132.1 |
| 6,618,983 B1 * | 9/2003 | Spragins | | 43/107 |
| 6,671,998 B1 * | 1/2004 | Lawrence, Sr. | | 43/58 |
| 6,691,454 B1 * | 2/2004 | Conroy | | 43/107 |
| 6,754,989 B2 * | 6/2004 | Eicher | | 47/33 |
| 6,758,008 B1 * | 7/2004 | Thebolt | | 43/58 |
| 6,786,016 B1 * | 9/2004 | Wood | | 43/121 |
| 6,931,798 B1 * | 8/2005 | Pocai | | 47/33 |
| 6,955,007 B2 * | 10/2005 | Gehret et al. | | 43/61 |
| 7,165,354 B1 * | 1/2007 | Rickenbacker | | 43/121 |
| 7,306,402 B2 * | 12/2007 | Graber et al. | | 47/33 |
| 7,434,788 B2 * | 10/2008 | Foster | | 43/124 |
| 7,555,863 B1 * | 7/2009 | Caldwell | | 47/33 |
| 7,854,088 B2 * | 12/2010 | Kurachi | | 43/61 |
| 7,866,086 B2 * | 1/2011 | Murchison | | 43/66 |
| 7,900,395 B2 * | 3/2011 | Leiter | | 47/33 |
| 2004/0237380 A1 * | 12/2004 | Carpenter | | 43/132.1 |
| 2006/0283075 A1 * | 12/2006 | Feldhege et al. | | 43/121 |
| 2007/0180764 A1 * | 8/2007 | Forman et al. | | 47/33 |
| 2008/0052982 A1 * | 3/2008 | Windsor | | 43/107 |
| 2009/0038214 A1 * | 2/2009 | Rozen | | 47/33 |
| 2009/0272023 A1 * | 11/2009 | Ramos-Santiago | | 43/121 |
| 2010/0226720 A1 * | 9/2010 | Meert et al. | | 47/33 |
| 2010/0242357 A1 * | 9/2010 | Vogler et al. | | 47/33 |

FOREIGN PATENT DOCUMENTS

| | | | |
|---|---|---|---|
| CH | 639242 A5 * | 11/1983 | |
| CH | 686922 A5 * | 8/1996 | |
| CH | 687291 A5 * | 11/1996 | |
| CH | 691002 A5 * | 3/2001 | |
| DE | 3235586 A1 * | 3/1984 | |
| DE | 3327048 A1 * | 4/1984 | |
| DE | 3335100 C1 * | 8/1984 | |
| DE | 3436046 A1 * | 5/1985 | |
| DE | 3524923 A1 * | 10/1986 | |
| DE | 3533909 A1 * | 4/1987 | |
| DE | 3539071 A1 * | 5/1987 | |
| DE | 3644512 A1 * | 6/1987 | |
| DE | 3804119 A1 * | 8/1989 | |
| DE | 3804120 A1 * | 8/1989 | |
| DE | 4102165 A1 * | 7/1992 | |
| DE | 4241202 A1 * | 6/1994 | |
| DE | 19543397 C1 * | 10/1996 | |
| DE | 19821610 A1 * | 6/1999 | |
| DE | 19812530 A1 * | 9/1999 | |
| DE | 19831790 A1 * | 2/2000 | |
| DE | 19960874 A1 * | 10/2000 | |
| DE | 19922205 A1 * | 11/2000 | |
| DE | 10043152 A1 * | 3/2002 | |
| DE | 10043642 A1 * | 3/2002 | |
| DE | 10128297 A1 * | 3/2002 | |
| DE | 10045330 A1 * | 4/2002 | |
| DE | 10111623 A1 * | 9/2002 | |
| DE | 10116227 A1 * | 10/2002 | |
| DE | 10233730 A1 * | 2/2003 | |
| DE | 10207916 C1 * | 4/2003 | |
| DE | 10160238 A1 * | 6/2003 | |
| DE | 10208554 A1 * | 9/2003 | |
| DE | 10319722 A1 * | 12/2003 | |
| DE | 10338896 A1 * | 3/2005 | |
| EP | 1266569 A1 * | 12/2002 | |
| GB | 2270455 A * | 3/1994 | |
| GB | 2397020 A * | 7/2004 | |
| JP | 04183352 A * | 6/1992 | |
| JP | 06141748 A * | 5/1994 | |
| JP | 2000316455 A * | 11/2000 | |
| JP | 2006166783 A * | 6/2006 | |
| JP | 2008022730 A * | 2/2008 | |
| WO | WO 2006010279 A1 * | 2/2006 | |
| WO | WO 2009092595 A1 * | 7/2009 | |

* cited by examiner

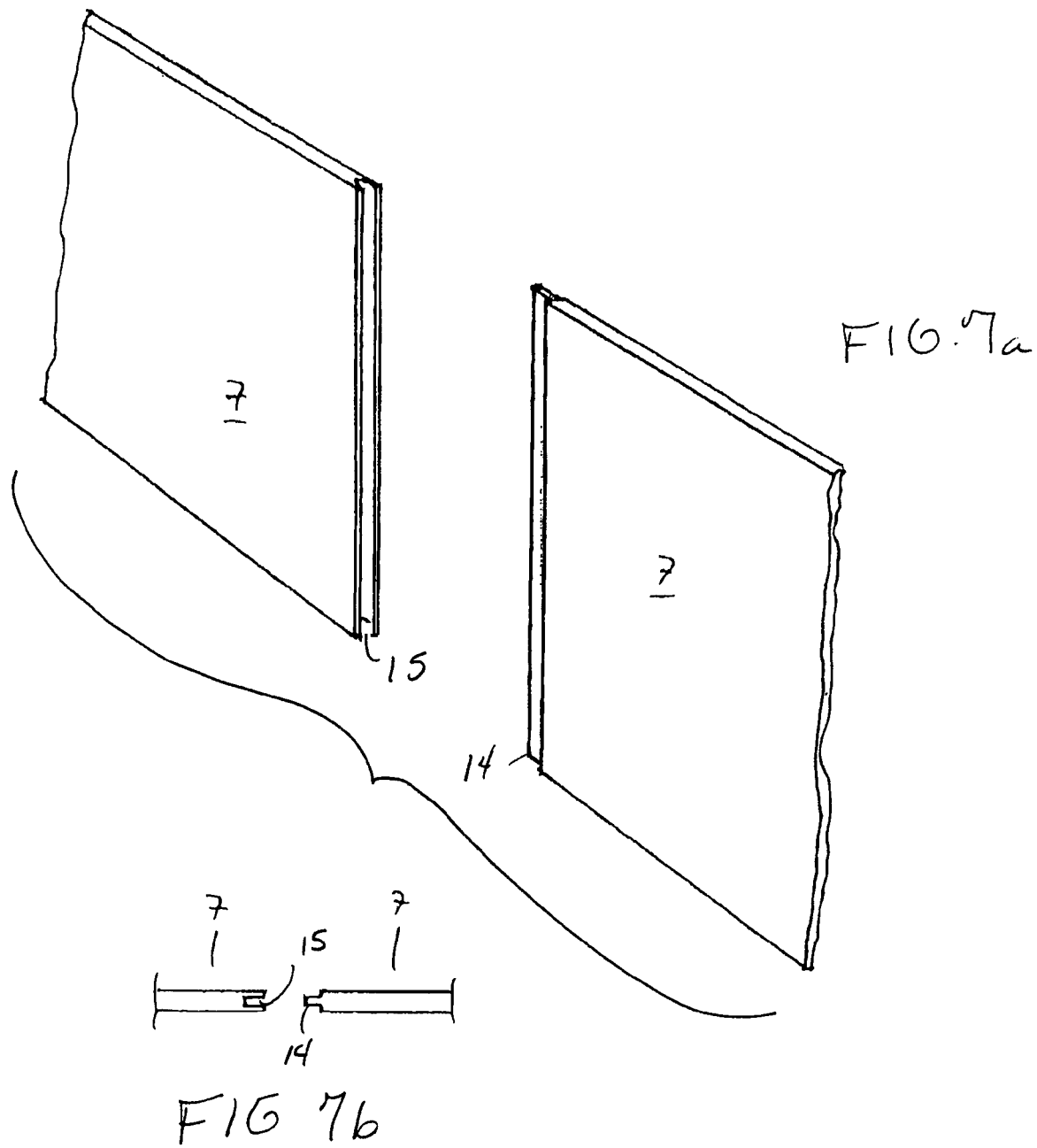

SYSTEM FOR REPELLING SMALL MAMMALS

CROSS REFERENCE TO RELATED APPLICATIONS

Applicants claim priority under 35 U.S.C. 119 of German Application No. 10 2007 057 244.3 filed Nov. 28, 2007.

BACKGROUND OF THE INVENTION

1. Field of the Invention

The invention relates to a system for repelling small mammals, for example voles, from areas used for agricultural or horticultural purposes.

2. The Prior Art

In order to protect such areas in agriculture or horticulture from voles or rats, for example, and to prevent these animals from penetrating into these areas, fences are put up, for example, which project into the ground to a depth of 30 to 40 cm, in order to make it difficult for the animals to get under them.

These fences, which are installed in a fixed manner and dug deeply into the ground, not only have the disadvantage of labor-intensive construction, but also the further disadvantage that if the cultivated area changes, they are not easily moved.

Furthermore, in addition to the attempt to deny the rodents access to the areas mentioned above, an attempt is furthermore made to keep the population density of the small mammals as low as possible. For this purpose, it has already been proposed to set up trough-like structures next to the areas to be protected, which have an access opening in a side wall, which might be provided with a flap that opens only in the access direction, but are configured to be open towards the top.

If an animal now enters this trough, it has no possibility of exiting this trough again, since the side walls are so high that it is impossible to cross them or climb up on them. The small mammals sitting in such traps can then be caught by predators such as raptors, foxes, or cats.

SUMMARY OF THE INVENTION

It is an object of the invention to combine both the blocking effect of a fence and the capturing effect of a trap with one another, using a single system.

The invention accomplishes this task with a system that consists of segments to be put together to form a gutter that is open towards the top, forming a type of fence, each having a base plate and walls that rise laterally from this base plate. An inlet opening is provided, at least in the side wall that faces away from the area to be protected.

The segments, which are connected with one another, one behind the other, thus form a barrier and, for another thing, also a trap, by means of the gutter-like structure.

Such a system can be easily moved by disassembly and reassembly, and this requires significantly less labor than erecting a fence.

The entry openings in the segments can be closed off, as described above, with a flap that opens only in the entry direction, so that the animals can enter the gutter, but not out again.

For humane reasons, however, it is desired, in many countries, for the animals to have a possibility to exit the gutter again, since they would starve if they have not already been captured by predators.

This humane aspect benefits from the experience that the animals generally find their way out again through the entry opening through which they entered. Experience has shown that the animals search for an exit opening on the wall that lies opposite the entry opening (in the direction of the area to be protected), and if they do not find an exit opening, they move along this wall, so that predators have the opportunity to catch the small mammal during this time, but the small mammal also has the opportunity to find one of the entry openings after a certain amount of time, after all, and to exit the gutter.

In a preferred embodiment of the invention, each segment consists of plates that can be inserted into one another, and accommodation openings are provided in the side walls, for insertion elements complementary to these accommodation openings, situated at the side edges of the base plate.

The production of such plates is significantly simpler, as are storage and transport, in contrast to the production of a gutter-shaped segment in one piece.

By simply putting together a base part and two side parts, a segment is created, and afterwards, this segment is lined up with others having a similar structure.

Preferably, the accommodation openings are disposed in multiple rows, on top of one another. In this way, a segment is created that can easily be displaced in the x-y direction.

By utilizing a row of accommodation openings disposed above this, the side walls reach beyond the base plate towards the bottom, so that these can be inserted into the ground.

Another possibility results in that, for example, the base plate is inserted into the lower row of accommodation openings of the side wall on the side that lies towards the area to be protected, while the base plate is inserted into a higher row of accommodation openings of the side wall on the opposite side. In this way, it is guaranteed that the side wall reaches farther into the ground on the entry opening side than on the opposite side. Thus, an underground blocking effect is also achieved.

It is advantageous if the segments are put together from plastic plates; this allows inexpensive production, for one thing, and for another brings with it the advantage that such segments do not rot quickly.

By putting them together skillfully, corner regions can also be produced using the three segment parts described above. However, in order to make the system complete, a square base plate having side walls that abut one another at a right angle, is provided, to form such corner regions, in each instance.

If the system is not supposed to completely enclose the region to be protected (if, for example, a masonry wall is already present), additional face elements for closing off the end of the gutter are provided.

Although various possibilities can be imagined for connecting the individual segments with one another, the gutter-shaped segments can be inserted into one another by way of tongue/groove connections. Such tongue/groove connections can be formed into the plastic plates during the production process.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIGS. 7a and 7b shows a the connection of two segments to one another.

DETAILED DESCRIPTION OF THE PREFERRED EMBODIMENT

Figure 1:
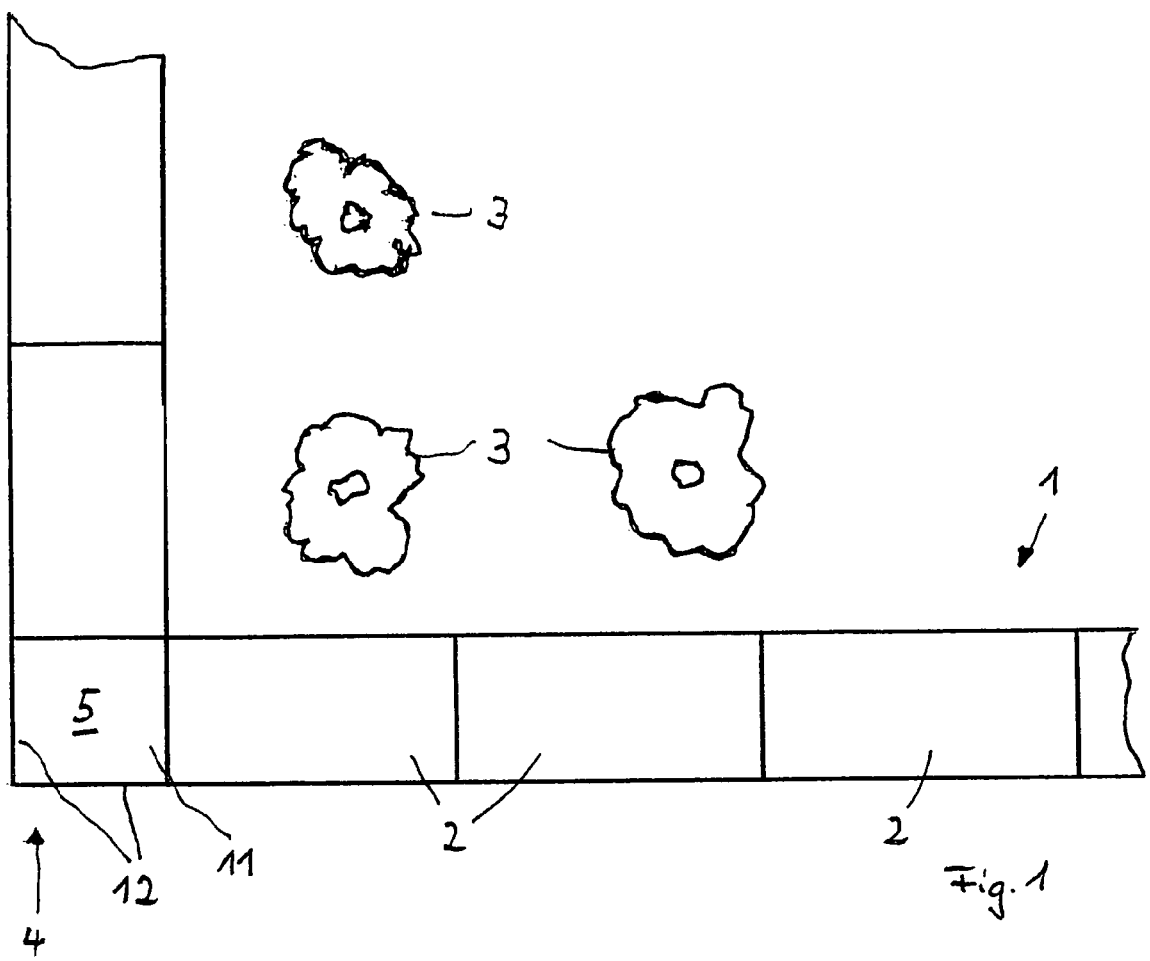
FIG. 1 shows a system according to one embodiment of the invention, disposed to form a fence, in a broken-off representation.

Referring now in detail to the drawings, FIG. 1 shows a system for repelling small mammals, for example voles, to prevent them from entering areas used for agriculture or horticulture, and provided, in general, with the reference symbol 1. This system 1 consists of individual segments 2, which are connected with one another to form a fence-like structure. This fence-like structure, consisting of segments 2, encloses a horticultural area that is indicated by individual trees 3.

Figure 6:
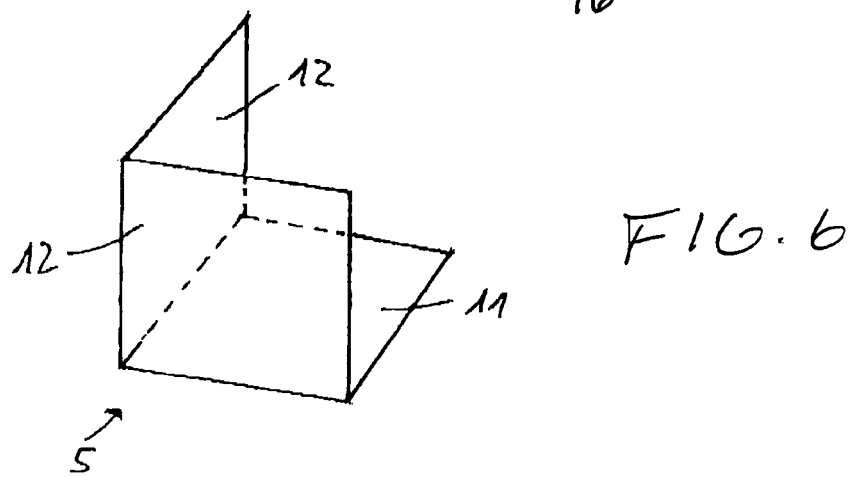
FIG. 6 shows a corner segment.

In the corner region 4, where segments 2 meet at a right angle, a corner part 5 is provided. Corner part 5 consists of a square base plate 11 and side parts 12 that abut one another at a right angle, as shown in FIG. 6.

Individual segments 2 and also corner part 5 are attached to one another by means of a tongue/groove connection, for example, such as shown in FIGS. 7a and 7b, where tongue 14 of one side wall 7 fits with groove 15 of another side wall 7 to form the connection.

Figure 2:
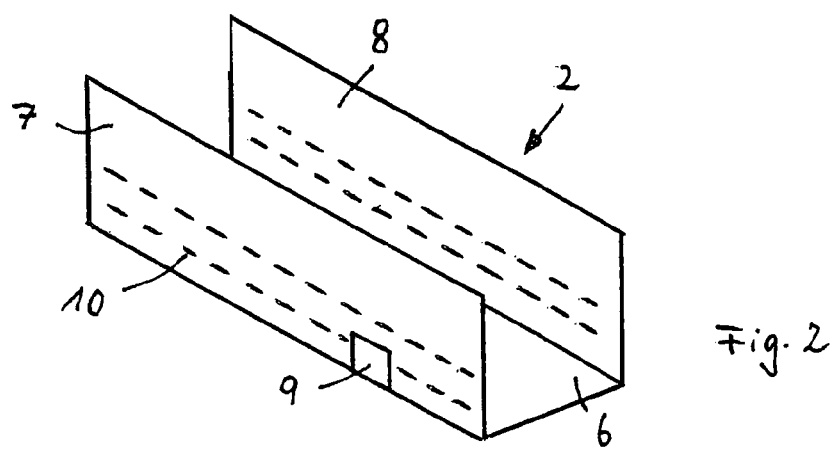
FIG. 2 shows an individual segment of the system.

A segment 2 is shown in a perspective representation in FIG. 2. Segment 2 consists of a base plate 6 and two side walls 7 and 8, respectively, that rise from base plate 6 at a right angle.

Figure 4:
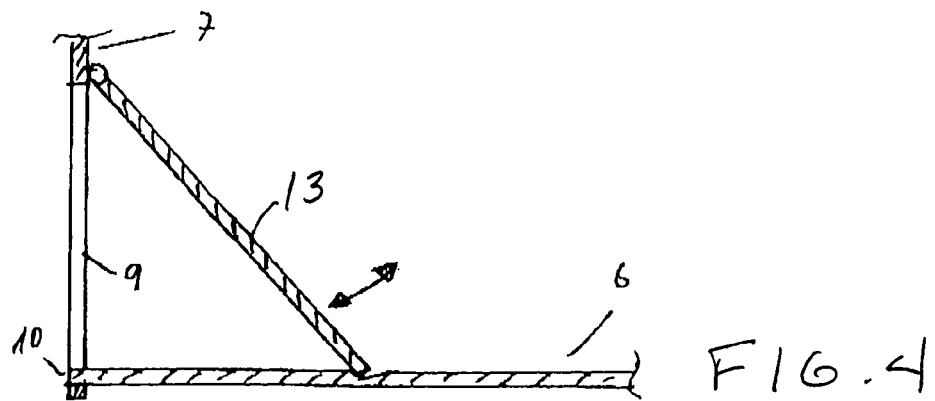
FIG. 4 shows a flap connected to one of the segments.

An entry opening 9 is provided in side wall 7, which opening can be closed off by a flap 13, shown in FIG. 4. Flap 13 opens only in one direction so that the animal cannot exit out through the flap. The segment can also be structured without such a flap.

Figure 3A:
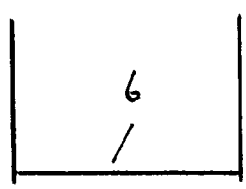
FIGS. 3a to c show alternatives for inserting the segments into one another.
Figure 5:
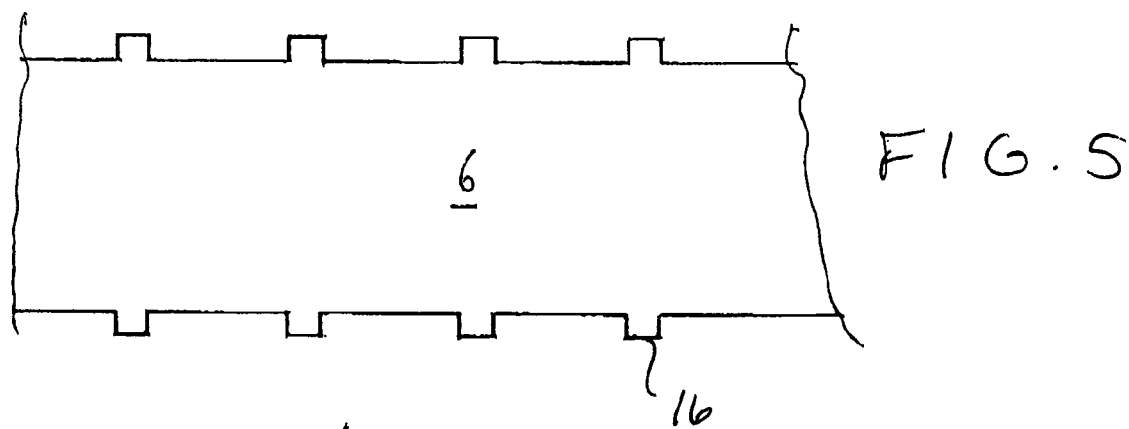
FIG. 5 shows the base plate of one of the segments.

Base plate 6 is assembled to side plates 7 and 8 by way of insertion connections. In FIG. 2, the state that is also shown in FIG. 3a is shown. In this connection, tabs 16 (shown in FIG. 5) provided at the side edges of base plate 6 are inserted into a row of corresponding accommodation openings 10 in side plates 7.

As is evident from FIG. 2, multiple such rows of accommodation openings 10 are provided, at a distance from one another. In this connection, it is important that the uppermost row is so far away from the top edge that these accommodation openings 10 cannot serve as climbing aids for the animals trapped in the segment 2.

When assembling the segments 2, which consist of plastic plates, the possibility exists, as shown in FIG. 2 and in FIG. 3a, to merely set the segment down on the ground underneath, so that it is still possible to move and displace it afterwards.

Figure 3B:
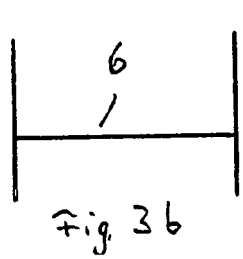

In FIG. 3b, it is shown that side plates 7, 8 project downward beyond base plate 6, so that such a segment can be pressed into the ground to a slight extent.

Figure 3C:
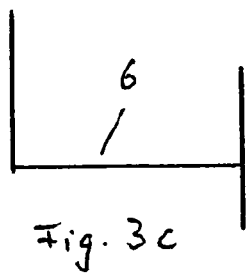

Finally, in FIG. 3c it is shown that one of the side plates, either 7 or 8, can project further downward beyond base plate 6, while the opposite one remains in the state according to FIG. 3a. In this manner, a fence trap having such a structure is given an additional underground blocking effect.

Accordingly, while only a few embodiments of the present invention have been shown and described, it is obvious that many changes and modifications may be made thereunto without departing from the spirit and scope of the invention.

What is claimed is:

1. A system for protecting areas used for agricultural or horticultural purposes against small mammals, comprising:
a plurality of segments adapted to be assembled together to form a gutter that is open towards a top of said gutter, and forming a fence, each of said plurality of segments having a base plate and walls that rise laterally from said base plate,
wherein an inlet opening is provided in at least one of said plurality of segments, in one of said walls that faces away from an area to be protected, and further comprising a flap that closes off the inlet opening, said flap opening in only one direction,
wherein the base plate and the walls of each one of said plurality of segments comprise plates that can be inserted into one another, and wherein accommodation openings are provided in the walls and receive insertion elements complementary to the accommodation openings, said insertion elements being provided on side edges of the base plate, to assemble the plates together.

2. The system according to claim 1, wherein the accommodation openings are disposed in multiple rows, on top of one another.

3. The system according to claim 1, wherein the plates of each of said plurality of segments is composed of plastic plates, and wherein the plurality of segments composed of plastic plates are inserted into one another.

4. The system according to claim 1, further comprising an additional segment having a square base plate and side walls, and wherein said side walls of said additional segment abut each other at a right angle, for the formation of corner regions.

5. The system according to claim 1, wherein the segments can be inserted into one another by way of tongue/groove connections.

* * * * *